United States Patent
McCain et al.

(10) Patent No.: US 8,122,460 B2
(45) Date of Patent: Feb. 21, 2012

(54) PARTIAL DYNAMIC IMPLEMENTATION OF JAVA INTERFACES

(75) Inventors: Brian S. McCain, Tucson, AZ (US); Jason L. Peipelman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 12/100,772

(22) Filed: Apr. 10, 2008

(65) Prior Publication Data

US 2008/0216101 A1 Sep. 4, 2008

Related U.S. Application Data

(63) Continuation of application No. 11/031,169, filed on Jan. 7, 2005, now Pat. No. 7,367,032.

(51) Int. Cl.
  *G06F 13/00* (2006.01)
(52) U.S. Cl. .......................... 719/330; 719/331; 719/332
(58) Field of Classification Search .................. 719/330, 719/331, 332
  See application file for complete search history.

(56) References Cited

U.S. PATENT DOCUMENTS

| | | | |
|---|---|---|---|
| 6,023,579 A | 2/2000 | Hellgren et al. | |
| 6,345,382 B1 | 2/2002 | Hughes | |
| 6,415,434 B1 | 7/2002 | Kind | |
| 6,549,955 B2 | 4/2003 | Guthrie et al. | |
| 6,877,163 B1 * | 4/2005 | Jones et al. | 719/332 |
| 7,159,224 B2 * | 1/2007 | Sharma et al. | 719/310 |
| 7,433,917 B2 * | 10/2008 | Renaud | 709/203 |
| 2003/0046440 A1 | 3/2003 | Ricciardi | |
| 2004/0003130 A1 | 1/2004 | Becker et al. | |

* cited by examiner

*Primary Examiner* — Andy Ho
(74) *Attorney, Agent, or Firm* — Scully, Scott, Murphy & Presser, P.C.

(57) ABSTRACT

A system and method for implementing dynamic interfaces in a JAVA program including methods having a common implementation and other methods to be handled independently. The system comprises a first dynamic proxy object implementing an invocation handler for providing default implementations; a separate object providing implementations of any method in a defined interface that requires independent handling; and, a second dynamic proxy object provided for checking a method definition object for an implementation of the method, and in response, one of: invoking the method on the separate object if the implementation exists, and if the implementation does not exist, invoking the method on the first dynamic proxy object. The second dynamic proxy object thus allows for a single implementation for repetitive methods, while allowing special cases to be handled independently.

5 Claims, 1 Drawing Sheet

PARTIAL DYNAMIC IMPLEMENTATION OF JAVA INTERFACES

CROSS REFERENCE TO RELATED APPLICATIONS

This application is a continuation application of U.S. Ser. No. 11/031,169, filed Jan. 7, 2005 now issued as U.S. Pat. No. 7,367,032.

BACKGROUND OF THE INVENTION

1. Field of the Invention

The present invention relates to the JAVA® programming language and particularly, a system and method of implementing adapters and dynamic proxies to provide various dynamic implementations of interfaces.

2. Discussion of the Prior Art

In the JAVA® programming language (JAVA is a registered trademark of Sun Microsystems, Inc., located in Mountain View, Calif.) implementations of an interface must implement all methods defined in that interface. This is to guarantee a common interface between different object types. However, in some circumstances, implementations of various methods on a given interface are repetitive and could be implemented using a default behavior, while other methods may require specific implementations. In JAVA®, this is not easily accomplished. To have specific implementations of only a particular set of methods in an interface, there is an adapter pattern, which provides empty implementations of all methods, and subclasses implement only the methods that they need. However, this does not provide an easy default implementation of the other methods. To have a default implementation of all methods, there is also a dynamic proxy, which provides an easy way to have a default implementation of all methods in an interface. However, in this case, it is difficult to have specific implementations for particular methods since the default implementation is done in one method.

It would be highly desirable to provide an interface, which has some methods that can be implemented the same way, and other methods that must be handled specially.

SUMMARY OF THE INVENTION

It is thus an object of the present invention to provide JAVA® language functionality that provide methodology enabling execution of one or more methods that can be implemented in a similar way, and other methods that must be handled specially. Thus, there is provided a design for providing a default implementation of methods in an interface, while also allowing specific implementations to be used when needed. This does so by combining the concepts of adapters and dynamic proxies into a single pattern.

According to one aspect of the invention, there is provided a system and method for implementing dynamic interfaces in a JAVA program including methods having a common implementation and other methods to be handled independently comprising:

a first dynamic proxy object implementing an invocation handler for providing default implementations;

a separate object providing implementations of any method in a defined interface that requires independent handling; and, a second dynamic proxy object provided for checking a method definition object for an implementation of the method, and in response, one of: invoking the method on said separate object if the implementation exists, and if the implementation does not exist, invoking the method on the first dynamic proxy object.

The second dynamic proxy object thus allows for a single implementation for repetitive methods, while allowing special cases to be handled independently.

Advantageously, the invention is not limited to implementation in a JAVA application but may be applied to any platform-independent software application.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENTS

Figure 1:
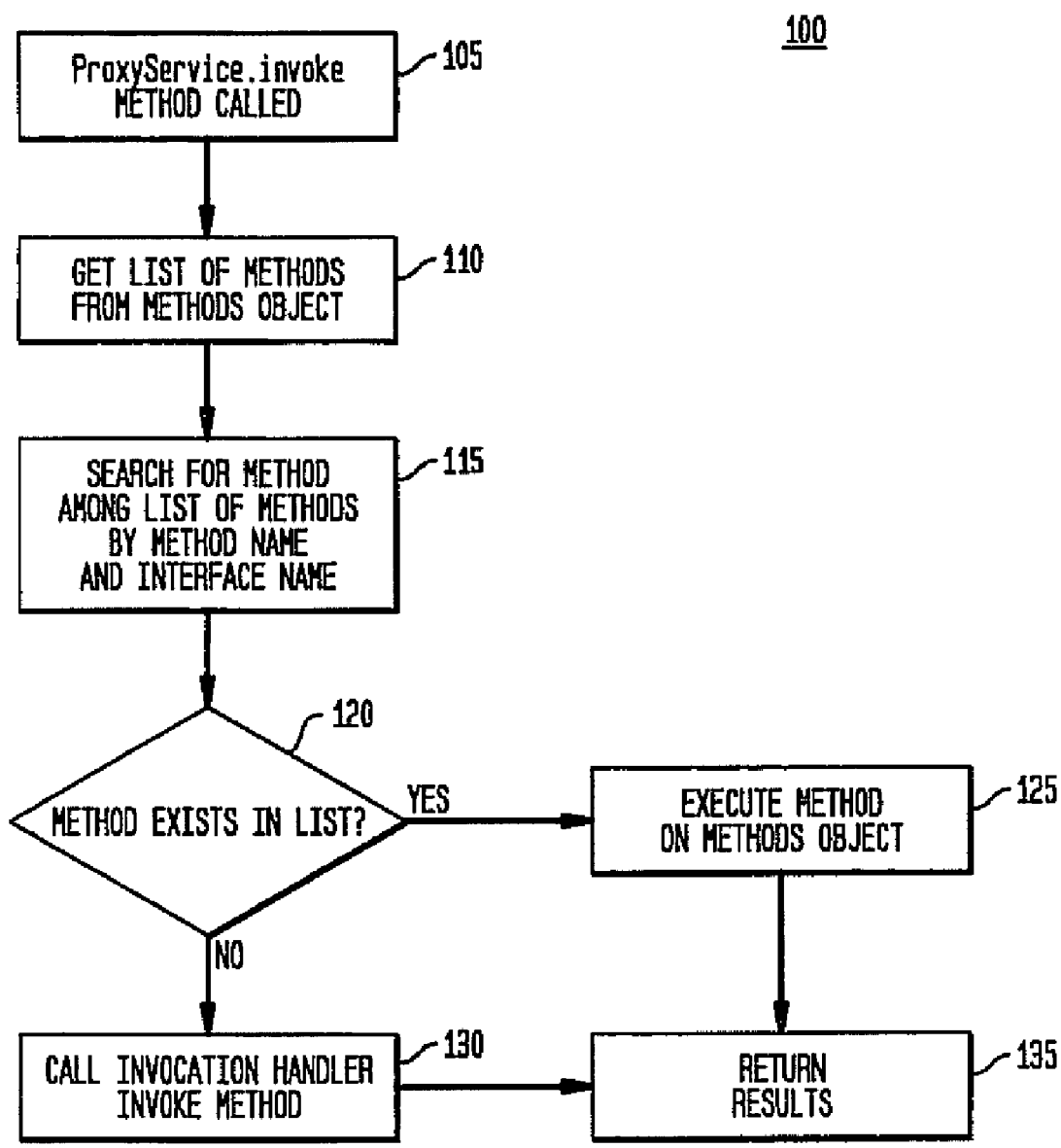
FIG. 1 illustrates a method flow depicting the functionality of the Proxy Service handler 100 according to the present invention.

This invention provides a system and method using a combination JAVA language constructs such as dynamic proxies and adapters to provide implementations of interfaces that have default implementations along with specific implementations of certain methods. The default implementation is done using an invocation handler as normally done with dynamic proxies. The specific implementations are written in an object called the method definition object. This object does not implement the interface, but provides implementations of any method in the interface that requires a specific implementation. The two objects are tied together using a second dynamic proxy, which checks the method definition object for an implementation of the method. If the implementation exists, it invokes the method on that object. If the implementation does not exist, it invokes the method on the dynamic proxy. The second dynamic proxy is the object returned to users of the interface.

For purposes of description, there is illustrated an example highlighting the novel JAVA® functionality of the invention. In the example, there is described an application that needs phone book functionality, particularly the ability to access phone book entries and generate phone book new entries, and assumes that all phone book entry information is stored in a Hashtable (not shown). For this example application, objects have been written to support the phone book needs of the application. The functionality the application needs implemented is exemplified by the following interface "PhoneBook" that defines the methods that are available to a particular object type:

```
public interface PhoneBook
{
    public String getPhoneNumber(String name);
    public String getAddress(String name);
    public String getCity(String name);
    public String getState(String name);
    public String getZipCode(String name);
}
```

In this example, "String name" will be used as a key to look-up information in the hashtable storing phone book entries. There is defined a public class PhoneBookEntry that is a data holder for all the information for a particular entry in a phone book and includes all basic information (name, phone number, etc.) and includes basic methods to retrieve, set or store information for an entry in the Hashtable. Assume that we have an object representing an entry as follows:

```
public class PhoneBookEntry
{
    private String name;
    private String phoneNumber;
    private String address;
    private String city;
    private String state;
    private String zipCode;
    public PhoneBookEntry(String name, String phoneNumber, String
            address, String city, String state, String zipCode);
    {
        this.name = name;
        this.phoneNumber = phoneNumber;
        this.address = address;
        this.city = city;
        this.state = state;
        this.zipCode = zipCode;
    }
    public String getName( )
    {
        return name;
    }
    public String getPhoneNumber( )
    {
        return phoneNumber;
    }
    public String getAddress( )
    {
        return address;
    }
    public String getCity( )
    {
        return city;
    }
    public String getState( )
    {
        return state;
    }
    public String getZipCode( )
    {
        return zipCode;
    }
}
```

In a typical implementation of this public interface Phone-Book, the following class "PhoneBookImpl" may be created from which real objects are instantiated. In this class, functionality is provided to interact with the table to get the entry information (look-up) keyed by the name being passed into it.

```
public PhoneBookImpl implements PhoneBook
{
    private Hashtable table = new Hashtable( );
    public String getPhoneNumber(String name)
    {
        PhoneBookEntry entry = (PhoneBookEntry)table.get(name);
        return entry.getPhoneNumber( );
    }
    public String getAddress(String name)
    {
        PhoneBookEntry entry = (PhoneBookEntry)table.get(name);
        return entry.getAddress( );
    }
    public String getCity(String name)
    {
        PhoneBookEntry entry = (PhoneBookEntry)table.get(name);
        return entry.getCity( );
    }
    public String getState(String name)
    {
        PhoneBookEntry entry = (PhoneBookEntry)table.get(name);
        return entry.getState( );
    }
    public String getZipCode(String name)
    {
        PhoneBookEntry entry = (PhoneBookEntry)table.get(name);
        return entry.getZipCode( );
    }
}
```

As can be seen, all of the get methods are practically identical, except that they call different "get" methods on the entry object. Since all the methods are so similar, a dynamic proxy "PhoneBookInvocationHandler" of this interface may be constructed that would reduce the amount of code written. A dynamic proxy, i.e., an object that is constructed at run time with an implementation for a particular interface ("Phonebook"), implements Invocation Handler class to implement the phonebook interface by passing the interface into the dynamic proxy to return a real object constructed at run time. Thus, every time a phonebook object method, e.g., getName, getPhoneNumber, etc, is called on the proxy that is generated, it is translated into a call to a single "invoke" method defined in this object. Basically, the parameters that come in include: the proxy (object that the method was called on), the actual method that was called, and the arguments (parameters called into that method originally, e.g., name passed to the methods defined in the interface).

```
public class PhoneBookInvocationHandler implements InvocationHandler
{
    private Hashtable table = new Hashtable( );
    public Object invoke(Object proxy, Method method, Object[ ] args)
        throws Throwable
    {
        // get the entry object. Since we are dealing with this abstractly,
        // we don't care about the type, so don't bother casting.
        Object entry = table.get(args[0]);
        // get the appropriate method defined in the PhoneBookEntry
        // class for the method defined in PhoneBook. Since they
        // have the same name, we can just use the name of the method
        // being passed in (the method called on the interface).
        Method m =
            PhoneBookEntry.class.getMethod(method.getName( ), null);
        // make the call, using reflection, and return the result.
        return m.invoke(entry, null);
    }
}
```

The PhoneBookInvocationHandler class essentially provides the exact same functionality as the PhoneBookImpl class defined above, but uses much less code as its redundancy is reduced, making it easier to debug and maintain. This implementation works fine, until the application needs different functionality that is not similar to the rest of the interface. Consider adding the following method to add an entry to the PhoneBook interface;

public void addEntry(String name, String phoneNumber,
        String address, String city, String state, String zipCode);

Adding this to the PhoneBookImpl is simple and straightforward, and would result in the following method added to the class:

```
public void addEntry(String name, String phoneNumber, String address,
        String city, String state, String zipCode)
{
    PhoneBookEntry entry =
        new PhoneBookEntry(name, phoneNumber,
            address, city, state, zipCode);
    table.put(name, entry);
}
```

While this example is simple (not much additional code required to be added), but when other methods are added that are similar to the existing get methods (e.g., adding new data in a phonebook entry such as "Country"), the code must be repeated again.

However, updating PhoneBookInvocationHandler to support this new addEntry function would now look as follows:

```
public Object invoke(Object proxy, Method method, Object[ ] args)
        throws Throwable
{
    if(method.getName( ).equals("addEntry"))
    {
        PhoneBookEntry entry =
            new PhoneBookEntry(name,
                phoneNumber, address, city, state,
                zipCode);
        table.put(name, entry);
    }
    else
    {
        // rest of code from previous implementation of Object invoke
    }
}
```

If many different types of methods are added to the interface that are not similar to other methods, this method will end up having many separate cases that are handled specially, and becomes more like the PhoneBookImpl implementation, though everything remains in one method. This is not desirable, because the invoke method can grow to be unwieldy. A preferred solution for this interface, which has some methods that can be implemented the same way, and others that must be handled specially, is solved by using an InvocationHandler (as above) for the methods that have a common implementation and having a separate object containing the methods that require special handling. The following is an example of the proxy object "ProxyService" which makes the determination and calls the appropriate methods based on what is called in it. That is, this ProxyService object, when invoked, will determine if the method should be executed for special case, or the general (redundant) case with the old invocation handler ("invoke") defined above.

```
public class ProxyService implements InvocationHandler
{
    /**
     * The invocation handler to call to send commands.
     */
    private InvocationHandler ih = null;
    /**
     * Object used for real implementations of particular methods.
     */
    private Object realObject = null;
    /**
     * The list of methods that are implemented by the real object.
     */
    private Method[ ] implementedMethods = null;
```

```
    public ProxyService(InvocationHandler h, Object realObject)
    {
        this.realObject = realObject;
        ih = h;
        implementedMethods =
            realObject.getClass( ).getDeclaredMethods( );
        // sort the list of implemented methods based on the method name and
        // the defining interface name for better performance
    }
    public Object invoke(Object proxy, Method method, Object[ ] args)
    throws Throwable
    {
        Object returnVal = null;
        int index;
        if(implementedMethods contains method)
        {
            returnVal = implementedMethods[index].invoke(realObject, args);
        }
        else
        {
            returnVal = ih.invoke(proxy, method, args);
        }
        return returnVal;
    }
}
```

Referring to the phone book example, the PhoneBookInvocationHandler class would remain as it was originally (without the addEntry case). Instead, a new object would be created to handle the special case of addEntry as follows:

```
public class PhoneBookMethods
{
    public void addEntry(String name, String phoneNumber, String
            address, String city, String state, String zipCode)
    {
        PhoneBookEntry entry =
            new PhoneBookEntry(name, phoneNumber,
                address, city, state, zipCode);
        table.put(name, entry);
    }
}
```

With this ProxyService class, separate method implementations are handled independently and do not impact the code written to handle the generic cases (in the invocation handler). If a new method is added that works like the generic case, no new code is needed to support it. If a new method is needed that does not work like the generic case, it can be added to the methods object without impacting any existing code. This allows for maximum flexibility and maintainability of the code.

FIG. 1 illustrates a method flow depicting the functionality of the Proxy Service handler 100 according to the present invention. As shown in FIG. 1, a first step 105 includes the application call to invoke the ProxyService method. Then, as shown at step 110, a second step comprises the functionality for obtaining a list of the methods defined in the real object (e.g., from the Method's object via getDeclaredMethods( )) for storage in an array (not shown). While not shown, an optional step of sorting the list of implemented methods based on the method name and the defining interface name may be performed for better performance. It is within the purview of skilled artisans to be able to program in JAVA® this array sorting functionality. Then, as shown at step 115, a step is implemented for conducting a search (e.g., a binary search) for a method among the list of implemented methods by method name and interface name. Then, at step 120, a decision is made as to whether the method exists in the list (i.e., if (implementedMethods contains method)). If the method is included in the list (i.e., the array contains the method), the real object has an implementation and should be invoked as shown at step 125; otherwise, if the method is not found, then the earlier defined invocation handler is used as indicated at step 130. In either case, the results would be returned at step 135.

Examples of how an application would use each of the example JAVA constructs described herein (e.g., the old cases PhoneBookImpl, PhoneBookInvocationHandler and the new ProxyService) is now provided:

1) Example Code Illustrating Use of PhoneBookImpl:

```
public class Example1
{
    public static void main(String[ ] args)
    {
        PhoneBook pb = new PhoneBookImpl( );
        // lookup the name passed in
        String pn = pb.getPhoneNumber(args[0]);
        System.out.println(args[0] + ": " + pn);
    }
}
```

2) Example Code Illustrating Use of PhoneBookInvocationHandler:

```
public class Example2
{
    public static void main(String[ ] args)
    {
        ClassLoader cl = PhoneBook.class.getClassLoader( );
        Class[ ] i= new Class[ ] {PhoneBook.class};
        PhoneBookInvocationHandler pbih = new
            PhoneBookInvocationHandler( );
        PhoneBook pb = Proxy.newProxyInstance(cl, i, phih);
        // lookup the name passed in
        String pn = pb.getPhoneNumber(args[0]);
        System.out.println(args[0] + ": " + pn);
    }
}
```

3) Example Code Illustrating Use of ProxyService:

```
public class Example3
{
    public static void main(String[ ] args)
    {
        ClassLoader cl = PhoneBook.class.getClassLoader( );
        Class[ ] i = new Class[ ] {PhoneBook.class};
        PhoneBookInvocationHandler pbih = new
            PhoneBookInvocationHandler( );
        PhoneBookMethods pbm = new PhoneBookMethods( );
        ProxyService ps = new ProxyService(pbih, pbm);
        PhoneBook pb = Proxy.newProxyInstance(cl, i, ps);
        // lookup the name passed in
        String pn = pb.getPhoneNumber(args[0]);
        System.out.println(args[0] + ": " + pn);
    }
}
```

Example 3 is similar to example 2 in that it uses a Proxy object to construct an implementation of the PhoneBook interface to use. The difference is the use of the ProxyService object, which is provided as the InvocationHandler for the Proxy, instead of the PhoneBookInvocationHandler, as in example 2. The PhoneBookInvocationHandler is used by the ProxyService object for executing methods in the general case, while the PhoneBookMethods object, containing the specific implementations of certain methods, is used for executing the rest of the methods.

The embodiment of the invention described herein, may be implemented in an application (e.g., stand-alone, or client/server-based or distributed object-based) or an applet written in the platform-independent programming language of JAVA®. However, the invention is not limited to JAVA® application code only. For example, the present invention can be applied to any platform-independent software application having application code that is "platform neutral" (e.g. that it can be distributed and run across different technical platforms). An example of platform neutral application-code is "bytecode" in the Java programming language. Alternative embodiments may utilize other platform-independent programming languages, and/or platform-independent techniques (such as virtual machines) not related to the programming language of Java or similar languages such as C#.

One common example of a virtual machine is the "Java virtual machine" ("JVM") that is typically used in conjunction with software applications and applets written in Java. However, the Java virtual machine can be configured or extended to operate for other programming languages rendering those languages potentially "platform independent." Similarly, other virtual machines designed with a particular application language in mind can be configured to allow utilization by application code components of a different type.

It is further understood that the present invention could be used in any application, whether distributed, client/server, or just on one machine. In a preferred implementation, the system and method of implementing these JAVA language constructs is used in a client/server model, where most methods called on the client are translated into network calls, for example, to be executed on the server. It is understood however, that some methods may be executed locally on the client.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system comprising: a server computer on which an object-oriented application invoking objects and methods is run, said server computer receiving calls from client devices requesting services provided by methods of said objects, and in response, configured to invoke methods having a common implementation and other methods having specific implementations to be handled independently according to a method comprising:

providing a first dynamic proxy object having an invocation handler for implementing a particular interface wherein calls to methods of the interface are translated into a single invoke method having said common implementation;

providing a method definition object providing implementations of any method in said particular interface that requires independent handling, said method definition object not implementing said particular interface; and, providing a second dynamic proxy object for checking said method definition object for an implementation of the method, and in response, one of: invoking the method on said method definition object if the implementation exists, and if the implementation does not exist, invoking the method on the first dynamic proxy object's invocation handler, wherein the second dynamic proxy object allows for a single implementation for repetitive methods, while allowing special cases to be handled independently.

2. The system as claimed in claim 1, wherein the object-oriented application is a Java application program, said first dynamic proxy implementing InvocationHandler class functionality for the methods that have a single common implementation.

3. The system as claimed in claim 2, wherein said checking said method definition object for an implementation of the method further comprises:

generating a list of methods from the implemented method's object; and, searching the list of methods from the implemented method's object to determine if said method exists in the generated list.

4. The system as claimed in claim 3, wherein said server computer is further configured to generate said list of methods in the form of an array.

5. The system as claimed in claim 4, wherein said server computer is further configured to sort the formed array of methods after said method list generating.

* * * * *